US006630675B2

(12) United States Patent
Ghelmansarai

(10) Patent No.: US 6,630,675 B2
(45) Date of Patent: Oct. 7, 2003

(54) X-RAY SCINTILLATOR COMPOSITIONS FOR X-RAY IMAGING APPLICATIONS

(75) Inventor: Farhad Abbasi Ghelmansarai, Danville, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 147 days.

(21) Appl. No.: 09/876,579

(22) Filed: Jun. 6, 2001

(65) Prior Publication Data

US 2002/0014591 A1 Feb. 7, 2002

Related U.S. Application Data

(60) Provisional application No. 60/220,960, filed on Jul. 26, 2000.

(51) Int. Cl.[7] .............................................. G01T 1/161
(52) U.S. Cl. ........................................ 250/366; 250/367
(58) Field of Search ............................... 250/366, 367, 250/368, 370.09, 370.11, 370.14, 483.1; 378/62, 65, 58

(56) References Cited

U.S. PATENT DOCUMENTS

| 4,421,671 | A |   | 12/1983 | Cusano et al. |   |
|---|---|---|---|---|---|
| 4,747,973 | A |   | 5/1988 | Cusano et al. |   |
| 4,783,596 | A |   | 11/1988 | Riedner et al. |   |
| 4,926,452 | A | * | 5/1990 | Baker et al. | 378/22 |
| 5,117,114 | A |   | 5/1992 | Street et al. |   |
| 5,262,649 | A | * | 11/1993 | Antonuk et al. | 250/370.09 |
| 5,265,013 | A |   | 11/1993 | King et al. |   |
| 5,521,387 | A |   | 5/1996 | Riedner et al. |   |
| 5,561,696 | A | * | 10/1996 | Adams et al. | 378/58 |
| 5,640,016 | A | * | 6/1997 | Matsuda et al. | 250/361 R |
| 5,882,547 | A |   | 3/1999 | Lynch et al. |   |
| 5,956,382 | A |   | 9/1999 | Wiener-Avnear et al. |   |
| 6,041,097 | A |   | 3/2000 | Roos et al. |   |
| 6,093,347 | A |   | 7/2000 | Lynch et al. |   |
| 6,313,465 | B1 | * | 11/2001 | Nittoh et al. | 250/370.11 |
| 6,384,417 | B1 | * | 5/2002 | Okumura et al. | 250/367 |

OTHER PUBLICATIONS

J. P. Creasey et al., "Time–Resolved Photoluminescence and X–Ray Luminescence Studies on Rare–Earth Oxysulfide Phosphors," Rare–Earth Doped Materials and Devices IV, Shibin Jiang, ed., Proceedings of SPIE vol. 3942 (2000).
"The trend towards digital x-ray imaging," Applied Scintillation Tech. (Apr. 13, 2000).
"Technical Summary & Usage Chart," Applied Scintillation Tech. (Apr. 22, 2000).

* cited by examiner

*Primary Examiner*—David Porta
*Assistant Examiner*—Otilia Gabor

(57) ABSTRACT

An x-ray imaging system includes a praseodymium (Pr) doped gadolinium oxysulfide ($Gd_2O_2S$) scintillator and a detector array positioned adjacent to the scintillator. The scintillator is particularly suited for x-ray imaging applications in which fast scan times are desired.

17 Claims, 1 Drawing Sheet

X-RAY SCINTILLATOR COMPOSITIONS FOR X-RAY IMAGING APPLICATIONS

This application claims the benefit of provisional application No. 60/220,960, filed Jul. 26, 2000.

TECHNICAL FIELD

This invention relates to x-ray scintillator compositions for x-ray imaging applications.

BACKGROUND

X-ray imaging systems have been used for a variety of different applications, including therapeutic and diagnostic applications, such as computerized tomography (CT) and digital radiography (DR).

Computerized tomography involves exposing a subject to a relatively planar beam or beams of x-ray radiation. By measuring the x-ray intensity (i.e., the x-ray absorption) along a plurality of different angles or views, x-ray absorption coefficients may be computed for various areas in any plane of the body through which the radiation passes. The absorption coefficients may be used to produce an image of the object or objects (e.g., the bodily organs of a human subject) being intersected by the x-ray beam. Radiation therapy involves delivering a high, curative dose of radiation to a target (e.g., a tumor), while minimizing the dose delivered to surrounding healthy tissues and adjacent healthy organs.

Diagnostic and therapeutic radiation may be supplied by a charged particle accelerator that is configured to generate a high-energy (e.g., several MeV) electron beam. The electron beam may be applied directly to one or more target sites on a patient, or it may be used to generate a photon (e.g., X-ray) beam, which is applied to the patient. An x-ray tube also may supply therapeutic photon radiation doses to a patient by directing a beam of electrons from a cathode to an anode formed from an x-ray generating material composition. The shape of the radiation beam at the target site may be controlled by discrete collimators of various shapes and sizes or by multiple leaves (or finger projections) of a multi-leaf collimator that are positioned to block selected portions of the radiation beam. The multiple leaves may be programmed to contain the radiation beam within the boundaries of the target site and, thereby, prevent healthy tissues and organs located beyond the boundaries of the target site from being exposed to the radiation beam.

An integral part of diagnostic and therapeutic x-ray imaging systems is the x-ray detector that receives the x-ray radiation, which has been modulated by passage through the body being examined or treated. The x-ray detector generally includes a scintillator material that emits optical wavelength radiation when excited by the impinging x-ray radiation. In typical medical or industrial applications, the optical output from the scintillator material impinges upon a photodetector array that produces electrical output signals corresponding to the optical radiation received from the excited scintillator material. The amplitude of the output signals is related to the intensity of the impinging x-ray radiation. The electrical signals may be digitized and processed to generate absorption coefficients in a form suitable to display on an imaging screen or on a recording medium.

In x-ray diagnostic and therapeutic applications, it is highly desirable to reduce the scan time as much as possible because, by reducing the scan time, a larger area of the patient may be covered in a given time (e.g., a single breath hold) and the cumulative radiation dose delivered to the patient (e.g., during positioning) may be reduced. Shorter scan times also reduce image blurring that might be caused by movement of the patient and internal organs. In general, the scan time of an x-ray imaging system is determined, at least in part, by the decay time of the scintillator.

In addition to having a fast decay time, an x-ray imaging scintillator should have a number of other properties. For example, the scintillator should be an efficient converter of x-ray radiation into optical radiation in a wavelength range that is most efficiently detected by the photodetector array of the x-ray detector. It is also desirable for the scintillator to transmit optical radiation efficiently. In addition, the scintillator material should have high x-ray stopping power, low hysteresis, spectral linearity, and short afterglow. High x-ray stopping power is desirable for efficient x-ray detection, because x-rays not absorbed by the scintillator escape detection. Hysteresis refers to the scintillator material property whereby the optical output varies for identical x-ray excitation, based on the irradiation history of the scintillator. Spectral linearity is important because x-rays impinging on the scintillator body typically include a number of different energies, and because the scintillator response to the radiation should be substantially uniform for all such energies. Afterglow is the tendency of the scintillator to continue to emit optical radiation for a period of time after the x-ray excitation has terminated. Long afterglow tends to blur the information-bearing signal over time. Furthermore, for applications requiring rapid sequential scanning (e.g., applications in which moving bodily organs are imaged), short afterglow is essential for rapid cycling of the detector.

SUMMARY

The invention features inventive scintillator compositions that are useful for x-ray imaging applications in general, and that are particularly suited for x-ray imaging applications in which fast scan times are desired.

In one aspect, the invention features an x-ray imaging system that includes a scintillator that comprises praseodymium (Pr) doped gadolinium oxysulfide ($Gd_2O_2S$) and a detector array that is positioned adjacent to the scintillator.

In a preferred embodiment, the scintillator comprises $Gd_2O_2S$ doped with a Pr concentration of 0.5–2.5 mole percent, a coating weight in the range of 30 $mg/cm^2$ to 150 $mg/cm^2$, and a particle size in the range of 7–10 $\mu m$.

The detector preferably comprises an array of amorphous silicon photodetector cells.

The invention also features a linear accelerator based x-ray imaging system and method, each of which incorporates the above-mentioned praseodymium-doped gadolinium oxysulfide scintillator.

Among the advantages of the invention are the following.

The use of the novel praseodymium (Pr) doped gadolinium oxysulfide ($Gd_2O_2S$) scintillator compositions of the invention enables image artifacts that otherwise might be caused by the pulse nature of linear accelerator based x-ray radiation sources to be reduced substantially, while maintaining relatively fast imaging scan times.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
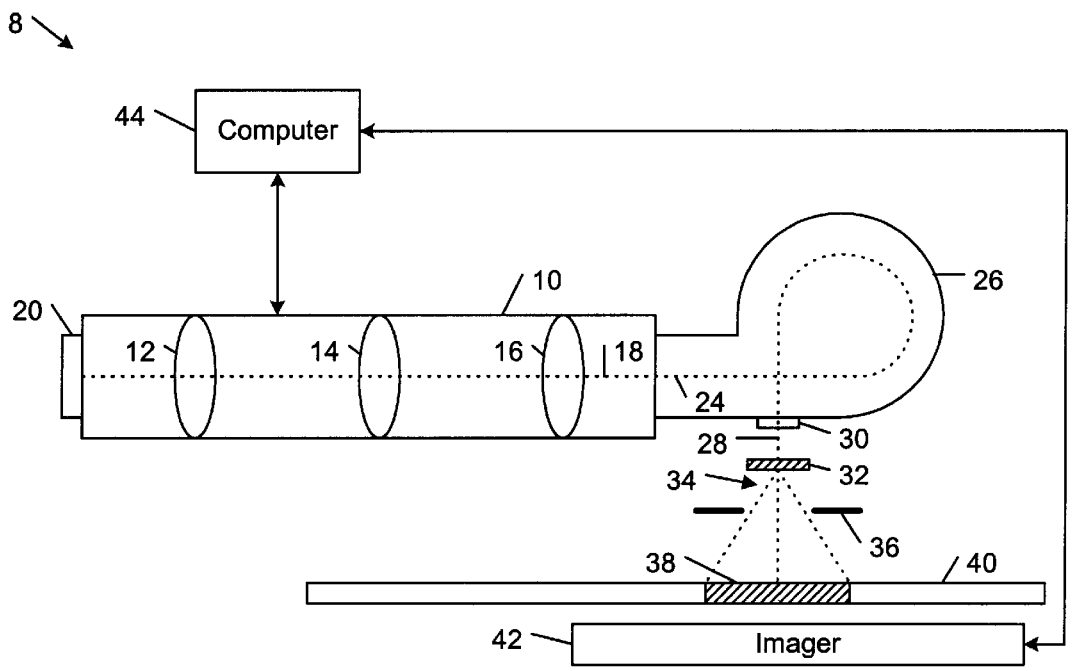
FIG. 1 is a block diagram of a radiation treatment device delivering a therapeutic radiation beam to a target site on a patient and an imager that is configured to detect x-ray radiation passing through the patient.

Referring to FIG. 1, in one embodiment, an x-ray imaging system 8 for use in a medical radiotherapy or diagnostic device includes a charged particle accelerator 10 with a series of accelerating cavities 12, 14, 16 that are aligned along a beam axis 18. A particle source 20 (e.g., an electron gun) directs charged particles (e.g., electrons) into accelerating cavity 12. As the charged particles travel through the succession of accelerating cavities 12–16, the particles are focused and accelerated by an electromagnetic field that is applied by an external source. The resulting accelerated particle beam 24 may be directed to a magnetic energy filter 26 that bends beam 24 by approximately 270°. A filtered output beam 28 is directed through a window 30 to a target 32 that generates an x-ray beam 34 with an energy on the order of 1 kV to 25 MV. The intensity of x-ray beam 34 typically is constant. One or more adjustable leaves 36 may be positioned to block selected portions of x-ray beam 34 to conform the boundary of x-ray beam 34 to the boundaries of a target site 38 on a patient 40. An imager 42 collects image data corresponding to the intensity of radiation passing through patient 40. A computer 44 typically is programmed to control the operation of leaves 36 to generate a prescribed intensity profile over the course of a treatment or an examination, and to control the operation of imager 42. Charged particle accelerator 10, energy filter 26, target 32, leaves 36, and imager 42 may be incorporated into a gantry that is configured to rotate about patient 40.

Figure 2:
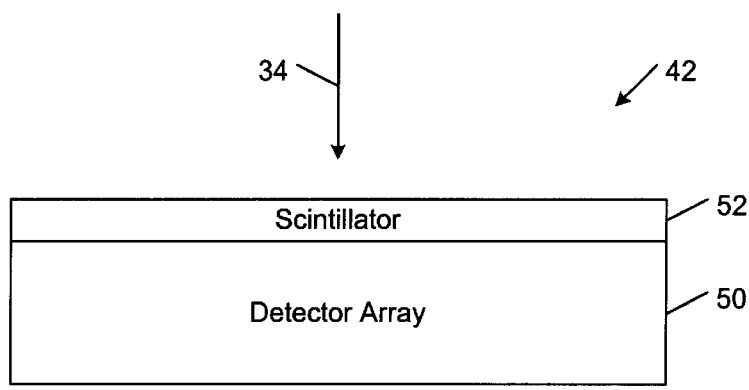
FIG. 2 is a block diagram of the x-ray imager of FIG. 1.

Referring to FIG. 2, in one embodiment, imager 42 includes a detector array 50 (e.g., an array of amorphous silicon photodetector cells) located behind a scintillator 52, which is positioned to receive a beam of x-ray radiation 34 that is incident on one face of imager 42. Detector array 50 may be implemented as a conventional amorphous silicon flat panel detector array. A readout circuit may be provided to produce output signals corresponding to the intensity of radiation detected by each of the cells of detector array 50. Scintillator 52 and detector array 50 may be implemented as separate components. For example, scintillator 52 may be constructed by depositing the scintillating material onto a reflecting substrate or an absorbing substrate using conventional scintillator fabrication techniques. Alternatively, scintillator 52 and detector array 50 may be implemented as an integrated structure (e.g., a monolithic semiconductor device with an overlying scintillator layer). Imager 42 may have an exposed detection area that is on the order of 40 cm by 40 cm. Additional details regarding the structure and operation of x-ray imagers may be found in U.S. Pat. Nos. 5,117,114, 5,262,649, 5,521,387 and 6,041,097, each of which is incorporated herein by reference.

As mentioned above, scintillator 52 is formed from one or more material compositions that make scintillator 52 especially suited for x-ray imaging applications in which fast scan times are desired. In particular, scintillator 52 is formed from praseodymium (Pr) doped gadolinium oxysulfide ($Gd_2O_2S$), with physical properties and a chemical composition selected to achieve a decay time that is on the order of 1–10 microseconds ($\mu s$). The use of such scintillator compositions enables image artifacts caused by the pulse nature of x-ray radiation produced by a linear accelerator to be reduced substantially, while maintaining relatively fast imaging scan times.

In general, the physical properties and the chemical composition of the $Gd_2O_2S$:Pr scintillator material are determined primarily by the following considerations: decay time, afterglow, x-ray efficiency, scintillator coating weight, and scintillator particle size. The Pr concentration determines the decay time and the afterglow of scintillator 52. For example, afterglow is reduced significantly as the Pr concentration is increased above 0.5 mole percent. However, increasing the Pr concentration reduces the x-ray conversion efficiency of scintillator 52. Consequently, the maximum Pr concentration is determined by such factors as the scintillator coating weight ($mg/cm^2$), the required imager spatial resolution (line pair per mm), and the gain of the readout circuit. The coating weight and particle size of the $Gd_2O_2S$ determine, at least in part, the light output and the spatial resolution of scintillator 52.

EXAMPLE

In one embodiment, the material composition of scintillator 52 includes $Gd_2O_2S$ doped with a Pr concentration in the range of 0.5 mole percent to 2.5 mole percent, and having a coating weight in the range of 30 $mg/cm^2$ to 150 $mg/cm^2$ and a particle size in the range of 7–10 $\mu m$.

Other embodiments are within the scope of the claims.

What is claimed is:

1. An x-ray imaging system, comprising:
    a scintillator comprising gadolinium oxysulfide ($Gd_2O_2S$) doped with a praseodymium (Pr) concentration of greater than about 0.5 mole percent; and not more than 2.5 mole percent; and
    a detector array positioned adjacent to the scintillator.
2. The x-ray imaging system of claim 1, wherein the scintillator comprises $Gd_2O_2S$:Pr with a coating weight in the range of 30 $mg/cm^2$ to 150 $mg/cm^2$.
3. The x-ray imaging system of claim 1, wherein the scintillator comprises $Gd_2O_2S$:Pr with a particle size in the range 7–10 um.
4. The x-ray imaging system of claim 1, wherein the detector array comprises an array of amorphous silicon photodetector cells.
5. The x-ray imaging system of claim 1, wherein the scintillator comprises $Gd_2O_2S$:Pr with a coating weight in the range of 30 $mg/cm^2$ to 150 $mg/cm^2$, and a particle size in the range 7–10 $\mu m$.
6. An x-ray imaging system, comprising:
    an x-ray source comprising a linear accelerator; and
    an x-ray imager positioned to intercept x-ray radiation produced by the x-ray source and passing through a patient, the x-ray imager comprising:
        a scintillator comprising gadolinium oxysulfide ($Gd_2O_2S$) doped with a praseodymium (Pr) concentration of greater than about 0.5 mole percent and not more than 2.5 mole percent; and
        a detector array positioned adjacent to the scintillator.
7. The x-ray imaging system of claim 6, wherein the scintillator comprises $Gd_2O_2S$:Pr with a coating weight in the range of 30 $mg/cm^2$ to 150 $mg/cm^2$.
8. The x-ray imaging system of claim 6, wherein the scintillator comprises $Gd_2O_2S$:Pr with a particle size in the range 7–10 $\mu m$.
9. The x-ray imaging system of claim 6, wherein the detector array comprises an array of amorphous silicon photodetector cells.

10. The x-ray imaging system of claim 6, wherein the scintillator comprises $Gd_2O_2S$:Pr with a coating weight in the range of 30 mg/cm$^2$ to 150 mg/cm$^2$, and a particle size in the range 7–10 μm.

11. The x-ray imaging system of claim 6, wherein the x-ray beam source is configured to produce a pulsed x-ray beam with an energy in the range of 1 kV to 25 MV.

12. An x-ray imaging method, comprising:

producing an x-ray beam with a linear accelerator; and intercepting x-ray radiation passing through a patient with an x-ray imager comprising:

a scintillator comprising gadolinium oxysulfide ($Gd_2O_2S$) doped with a praseodymium (Pr) concentration of greater than about 0.5 mole percent and not more than 2.5 mole percent; and a detector array positioned adjacent to the scintillator.

13. The x-ray imaging method of claim 12, wherein the scintillator comprises $Gd_2O_2S$:Pr with a coating weight in the range of 30 mg/cm$^2$ to 150 mg/cm$^2$.

14. The x-ray imaging method of claim 12, wherein the scintillator comprises $Gd_2O_2S$:Pr with a particle size in the range 7–10 μm.

15. The x-ray imaging method of claim 12, wherein the detector array comprises an array of amorphous silicon photodetector cells.

16. The x-ray imaging method of claim 12, wherein the scintillator comprises $Gd_2O_2S$:Pr with a coating weight in the range of 30 mg/cm$^2$ to 150 mg/cm$^2$, and a particle size in the range 7–10 μm.

17. The x-ray imaging method of claim 12, wherein the x-ray beam is produced in pulses each having an energy in the range of 1 kV to 25 MV.

\* \* \* \* \*